(12) United States Patent
Akagi et al.

(10) Patent No.: US 6,732,528 B2
(45) Date of Patent: May 11, 2004

(54) GAS TURBINE COMBUSTOR

(75) Inventors: Kouichi Akagi, Hyogo (JP); Souichirou Tomimoto, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/114,053

(22) Filed: Apr. 3, 2002

(65) Prior Publication Data

US 2003/0000216 A1 Jan. 2, 2003

(30) Foreign Application Priority Data

Jun. 29, 2001 (JP) .......................... 2001-199946

(51) Int. Cl.$^7$ .................................. F23R 3/06
(52) U.S. Cl. ................ 60/752; 60/746; 60/757
(58) Field of Search ................ 60/737, 746, 747, 60/748, 752, 755, 756, 757

(56) References Cited

U.S. PATENT DOCUMENTS

| | | | |
|---|---|---|---|
| 2,664,702 A | | 1/1954 | Lloyd et al. |
| 2,860,483 A | * | 11/1958 | Fox .............................. 60/757 |
| 3,705,492 A | | 12/1972 | Vickers |
| 4,392,355 A | | 7/1983 | Verdouw |
| 5,239,831 A | * | 8/1993 | Kuroda et al. ................. 60/737 |
| 5,357,745 A | * | 10/1994 | Probert ........................ 60/747 |
| 5,479,772 A | * | 1/1996 | Halila .......................... 60/747 |
| 5,487,275 A | * | 1/1996 | Borkowicz et al. ........... 60/747 |
| 5,836,164 A | * | 11/1998 | Tsukahara et al. ............ 60/747 |
| 5,950,417 A | * | 9/1999 | Robertson et al. ............ 60/746 |
| 6,056,538 A | * | 5/2000 | Buchner et al. .............. 60/746 |
| 6,082,111 A | * | 7/2000 | Stokes .......................... 60/737 |
| 6,105,372 A | * | 8/2000 | Mandai et al. ................ 60/755 |

FOREIGN PATENT DOCUMENTS

| | | |
|---|---|---|
| EP | 0900982 | 3/1999 |
| JP | 6-323164 | * 11/1994 |
| JP | 7-332113 | * 12/1995 |
| JP | 8-284688 | * 10/1996 |
| WO | WO 03/002913 | 9/2003 |

* cited by examiner

Primary Examiner—Ted Kim
(74) Attorney, Agent, or Firm—Oblon, Spivak, McClelland, Maier & Neustadt, P.C.

(57) ABSTRACT

An internal cylinder which has the opening section from which combustion gas is blown out is inserted into the tail cylinder which becomes a flow path of the combustion gas, and is engaged with the tail cylinder, while securing a clearance between the edge of the opening section and the internal wall surface of the tail cylinder. Air compressed with a compressor is jetted from the clearance along the internal wall surface of the tail cylinder, and a film of cooling air is formed on the internal wall surface of the tail cylinder.

5 Claims, 10 Drawing Sheets

PRIOR ART

FIG. 12

PRIOR ART

FIG. 13

PRIOR ART

GAS TURBINE COMBUSTOR

FIELD OF THE INVENTION

The present invention relates to a gas turbine combustor which can effectively suppress burning loss generated on the internal wall surface of a tail cylinder due to the catching of combustion gas.

BACKGROUND OF THE INVENTION

Figure 11:
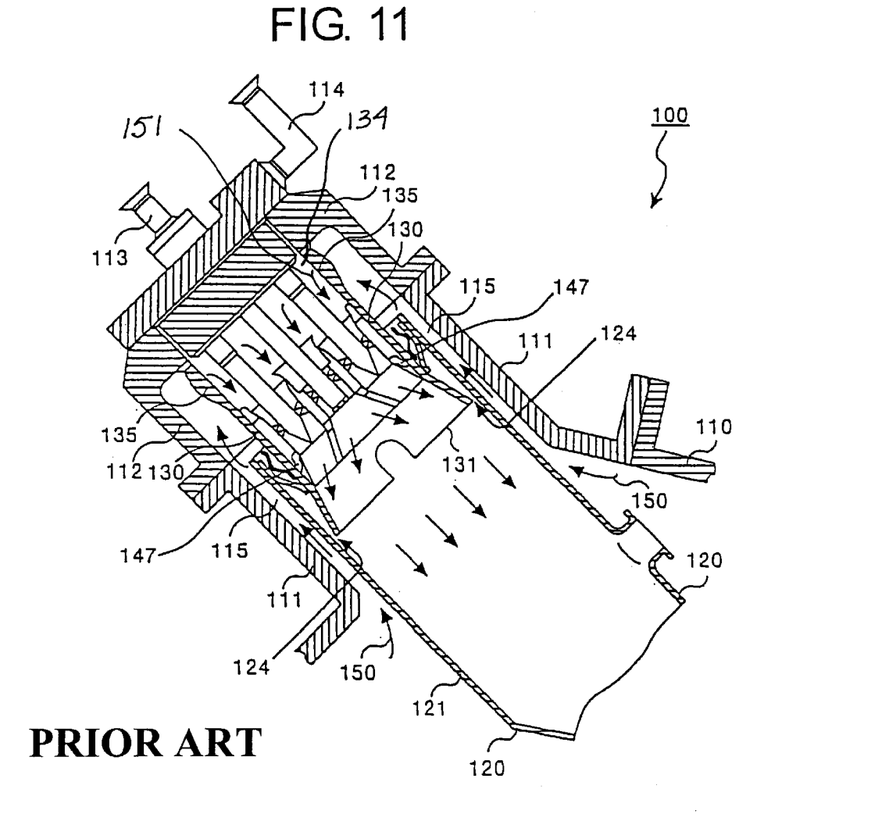
FIG. 11 is a total structure diagram which shows a conventional gas turbine combustor.
Figure 12:
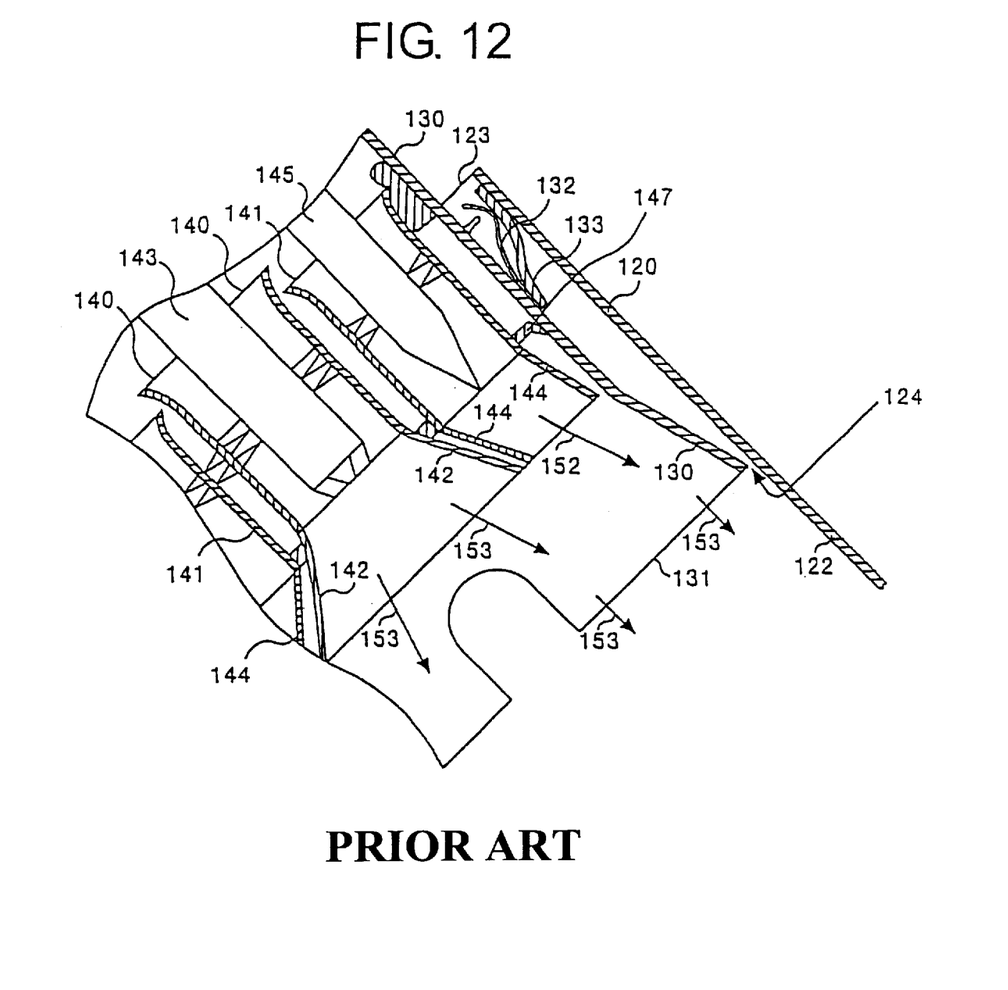
FIG. 12 is an enlarged diagram of a substantial part of the gas turbine combustor shown in FIG. 11.
Figure 13:
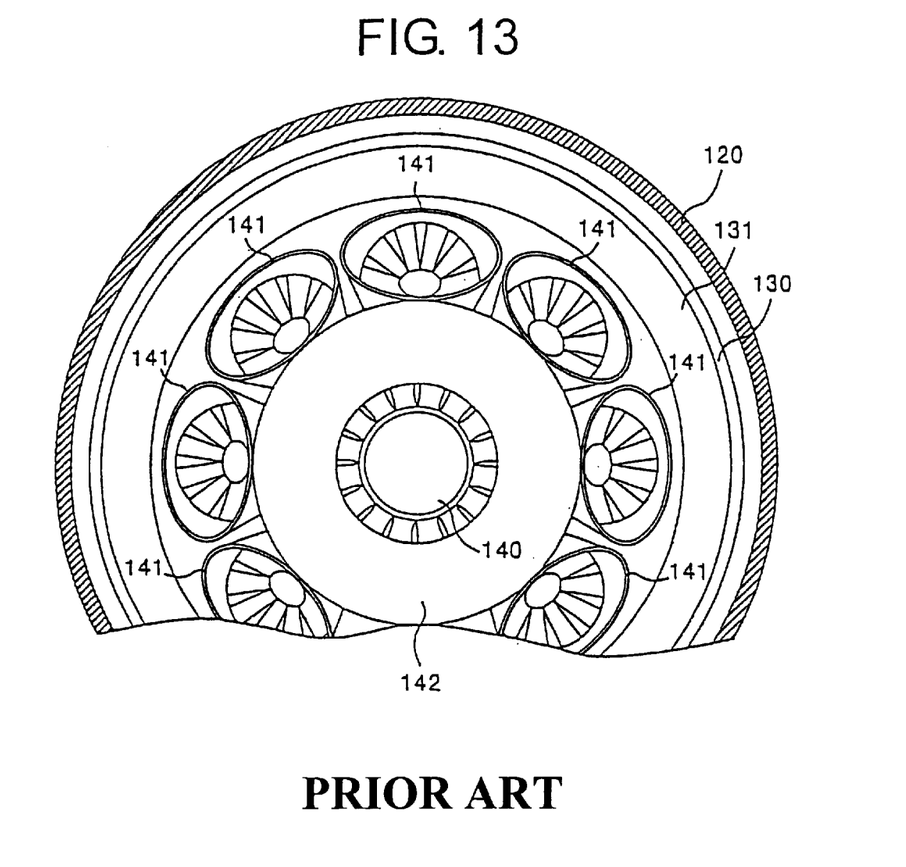
FIG. 13 is a front diagram of the gas turbine combustor shown in FIG. 11.

In a gas turbine combustor, there has been conventionally employed a structure which has an opening section of an internal cylinder inserted into a tail cylinder and installed there. FIG. 11 is a cross section of a complete conventional gas turbine combustor. FIG. 12 is an enlarged cross-sectional diagram and FIG. 13 is a front diagram of required portions of the gas turbine combustor shown in FIG. 11. As shown in FIG. 11 to FIG. 13, a gas turbine combustor 100 is constructed of an external cylinder 111 which is installed on a vehicle chamber 110, a tail cylinder 120 which is disposed within the vehicle chamber 110, an internal cylinder 130 which is inserted into and installed on this tail cylinder 120, and an external cylinder casing 112 which positions and fixes the internal cylinder 130 relative to the external cylinder 111. The external cylinder 111 is prepared using a metal member having a circular cylinder section, and is installed on the external side of the vehicle chamber 110, with the circular cylinder section set substantially perpendicular to this external side. The external cylinder 111 is fixed to the vehicle chamber 110 with bolts not shown. The tail cylinder 120 is prepared using a thin metal member, and has a circular cylinder section 121 and a nozzle section, not shown, with a front end of the circular cylinder section 121 curved mildly. The tail cylinder 120 is fixed, with a front end of the nozzle section connected to a combustion path of a turbine not shown. The tail cylinder 120 is installed on the external cylinder 111, with the circular cylinder section 121 inserted into the external cylinder 111. The tail cylinder 120 is positioned substantially on the same axis with the external cylinder 111.

The internal cylinder 130 is prepared using a metal member having a circular cylindrical shape. An opening section 131 of the internal cylinder 130 expands mildly and reaches an internal wall surface 122 of the tail cylinder 120. The internal cylinder 130 has a spring plate 132 made of a metal member, and a sealing plate 133 which is supported with this spring plate 132, on a side wall in the vicinity of the opening section 131. Further, the internal cylinder 130 has a pilot nozzle 140 which jets diffusion flame, and eight main nozzles 141 which are disposed around the pilot nozzle 140 and which jets combustion gas, within the internal cylinder 130. This pilot nozzle 140 has a tubular pilot cone 142 at its front end, and has a pilot fuel jet nozzle 143 inside the tubular pilot cone 142. The main nozzle 141 is extended with a main nozzle extension cylinder 144 in the vicinity of the opening section 131 of the internal cylinder 130, and has a jet section 145 at substantially the same position as the pilot cone 142. A main fuel jet nozzle 145 is disposed inside the main nozzle 141. The pilot nozzle 140 and the main nozzle 141 are fixed to the internal cylinder 130 with a substrate 147 which is installed on the internal wall of the internal cylinder 130.

The internal cylinder 130 is installed on the tail cylinder 120, with the opening section 131 inserted into the tail cylinder 120. The sealing plate 133 of the internal cylinder 130 is biased toward the internal wall of the tail cylinder 120 with the spring plate 132, and seals a section of engagement between the tail cylinder 120 and the internal cylinder 130. The internal cylinder 130 is engaged with the tail cylinder 120 by pressing the sealing plate 133 against the tail cylinder. An entrance 134 of the internal cylinder 130 is supported with the external cylinder casing 112, and the internal cylinder 130 is positioned substantially on the same axis with the external cylinder 111. The internal cylinder 130 is fixed to an aligned position, by having the external cylinder casing 112 fixed to the external cylinder 111 with bolts not shown. The internal cylinder 130 has a stay 135 which takes compressed air 150 into the inside, at the entrance 134. A reference numeral 113 denotes a pilot fuel supply opening 113 from which fuel is supplied to the pilot fuel jet nozzle 143, and reference numeral 114 denotes a main fuel supply opening 114 from which fuel is supplied to the main fuel jet nozzle 146.

In the conventional gas turbine combustor 100, air 150 compressed with a compressor not shown passes through a flow path 115 which is encircled with the external peripheral surface of the tail cylinder 120 and the external peripheral surface of the internal cylinder 130, and the internal peripheral surface of the external cylinder 111. This air enters the internal cylinder 130 from the stay 135. Air 151 which has entered the internal cylinder 130 is mixed with main fuel within the main nozzle 141, and a mixed gas is formed. This pre-mixed air 152 is blown out from the main nozzle extension cylinder 148, and is ignited with the diffusion flame, not shown, which is emitted from the pilot nozzle 140, to form a high-temperature combustion gas 153. This combustion gas 153 is blown out into the tail cylinder 120 from the opening section 131 of the internal cylinder 130, and is combusted within a combustion chamber 125, and the combusted gas is supplied to the turbine.

According to the conventional gas turbine combustor 100, however, there has been a problem that the internal wall of the tail cylinder 120 is damaged by burning with the combustion gas 153 which is blown out from the opening section 131 of the internal cylinder 130. In other words, according to the gas turbine combustor 100 having such a structure that the opening section 131 of the internal cylinder 130 is inserted into and engaged with the tail cylinder 120, the edge of the opening section 131 and the internal wall surface 122 of the tail cylinder 120 are not smoothly connected to each other. Therefore, a gap 124 generated at this connection section catches the high-temperature combustion gas 153 which has been blown out from the opening section 131, and this combustion gas burns the internal wall surface 122 of the tail cylinder 120.

SUMMARY OF THE INVENTION

The present invention has been achieved in order to solve the above problems and it is an object of this invention to provide a gas turbine combustor which can effectively suppress burning loss generated on the internal wall surface of the tail cylinder in the vicinity of the opening section of the internal cylinder.

In the gas turbine combustor according to the present invention, compressed air is jetted along an internal wall surface of a tail cylinder from a clearance secured between the internal wall surface of the tail cylinder and an edge of an opening section of an internal cylinder. As a result, a film of cooling air is formed on the internal wall surface of the tail cylinder whereby the internal wall surface of the tail cylinder is protected from a high-temperature combustion gas which is blown out from the opening section of the internal cylinder.

Other objects and features of this invention will become apparent from the following description with reference to the accompanying drawings.

DETAILED DESCRIPTIONS

Embodiments of the gas turbine combustor according to the present invention will be explained in detail below with reference to the accompanying drawings. It should be noted that the present invention is not limited to these embodiments. The following embodiments include constituent elements that persons skilled in the art can normally modify the design.

Figure 1:
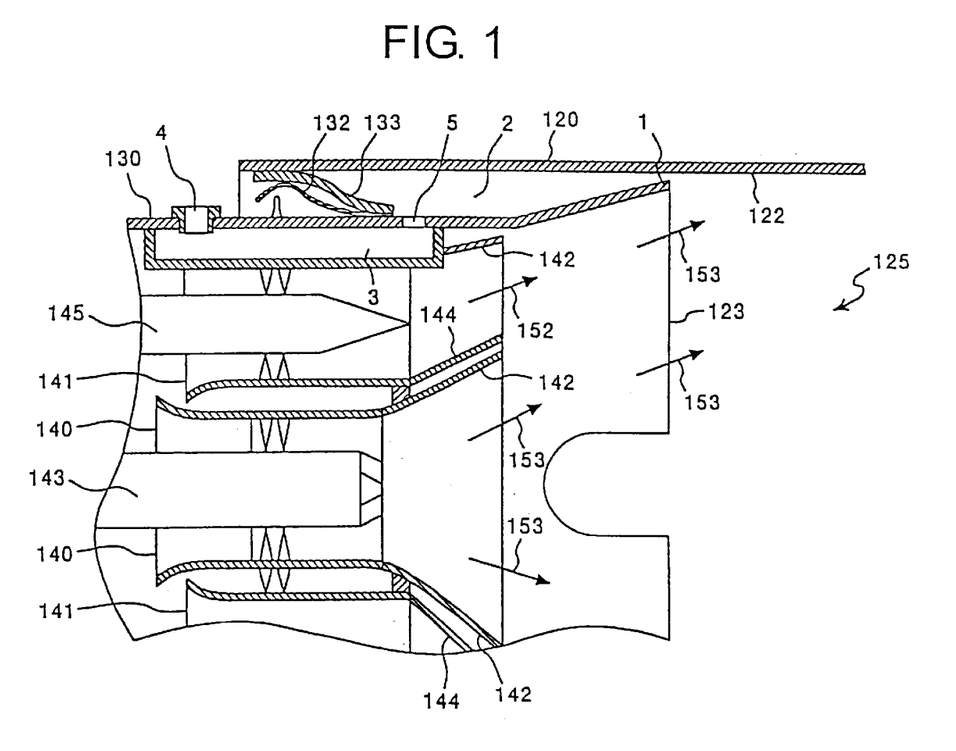
FIG. 1 is a cross-sectional diagram of a substantial part of a gas turbine combustor according to the present invention.
Figure 2:
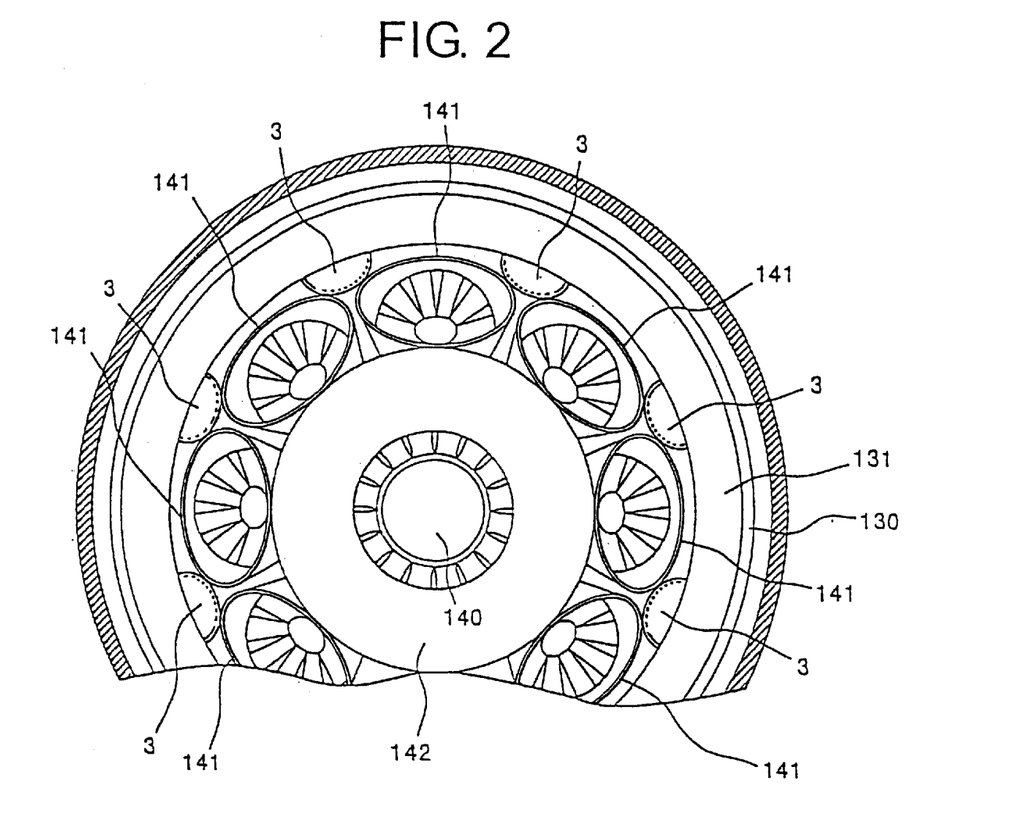
FIG. 2 is a front diagram of the gas turbine combustor shown in FIG. 1.

FIG. 1 is a cross-sectional diagram of a substantial part of the gas turbine combustor 100 according to an embodiment of the present invention. FIG. 2 is a front diagram of this gas turbine combustor. In these diagrams, constituent elements identical to those of the conventional gas turbine combustor 100 are attached with like reference numerals, and their explanation will be omitted. This gas turbine combustor 100 includes the tail cylinder 120, and the internal cylinder 130 which is inserted into this tail cylinder 120 and installed there. The internal cylinder 130 has the tail cylinder 120 fixed to the internal cylinder 130 from the inside with the sealing plate 133 and the spring plate 132 which are provided in the vicinity of the opening section 131. Inside the internal cylinder 130, there are disposed the pilot nozzle 140 which jets diffusion flame, and the main nozzle 141 which jet a high-temperature combustion gas 153.

A clearance 1 is provided between an edge of the opening section 131 of the internal cylinder 130 and the internal wall surface 122 of the tail cylinder 120. This clearance 1 has a substantially uniform width on an internal periphery of the opening section 131, and has a ring shape when observed from the front (refer to FIG. 2). This clearance 1 is communicated to a space 2 which is generated at a section of engagement between the internal cylinder 130 and the tail cylinder 120. This space 2 is encircled with a side surface of the opening section 131 of the internal cylinder 130, the sealing plate 133 of the internal cylinder 130, and the internal wall surface 122 of the tail cylinder 120, and has a ring shape. This space 2 is separated from the outside of the internal cylinder 130 with the sealing plate 133 which seals the engagement section in an opening section 123 of the tail cylinder 120. In the mean time, the internal cylinder 130 has an air path 3 formed along the internal periphery of the internal cylinder 130. This air path 3 is disposed alternately between eight main nozzles 141 which are provided inside the internal cylinder 130 (refer to FIG. 2). Therefore, there are eight air paths 3. Each air path is prepared by fixedly installing a slender box-shaped part 3 made of a metal member, on an internal wall surface 136 of the internal cylinder 130 by welding (refer to FIG. 3).

Figure 4:
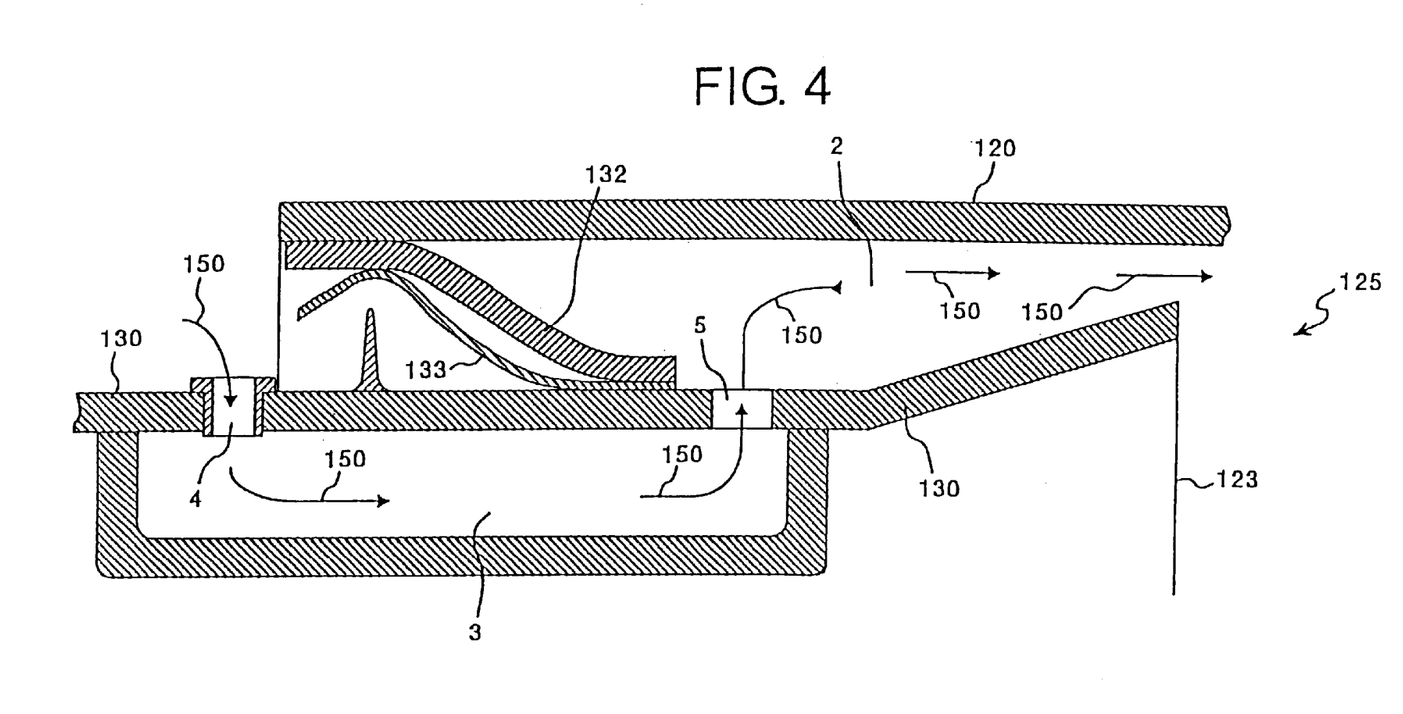
FIG. 4 shows an embodiment of an air-film forming unit.

FIG. 4 is a side cross-sectional diagram which shows the vicinity of the air path 3. In FIG. 4, the internal cylinder 130 has a circular air inlet 4 at a position not covered with the tail cylinder 120 on a side surface of the internal cylinder 130. Eight air inlets 4 are provided on the side surface of the internal cylinder 130, and these air inlets 4 are communicated to the air paths 3 provided on the internal periphery of the internal cylinder 130 respectively. The internal cylinder 130 has a circular air supply opening 5 in the space 2 of the section of engagement with the tail cylinder 120. There are also eight air supply openings 5, and they are communicated to the air paths 3 of the internal cylinder 130 respectively. One flow path that leads from the outside of the internal cylinder 130 to the combustion chamber 125 of the tail cylinder 120 is formed in the section from the air inlet 4 of the internal cylinder 130 to the space 2 of the engagement section.

In the present embodiment, air 150 compressed with the compressor has a higher pressure than the air within the combustion chamber 125 of the tail cylinder 120. Therefore, the air pressure in the combustion chamber 125 is higher than that in the space 2 at the engagement section. The air pressure in the air path 3 is higher than that in the space 2. Consequently, the compressed air 150 is taken into the air path 3 inside the internal cylinder 130 from the air inlet 4 of the internal cylinder 130 based on a difference between the pressures. This air is guided to the air supply opening 5 through the air path 3. The guided air 150 is supplied to the inside of the space 2 of the engagement section from the air supply opening 5. The air is then jetted to the combustion chamber 125 along the internal wall surface 122 of the tail cylinder 120 from the clearance between the tail cylinder 120 and the internal cylinder 130 (refer to FIG. 4).

Figure 5:
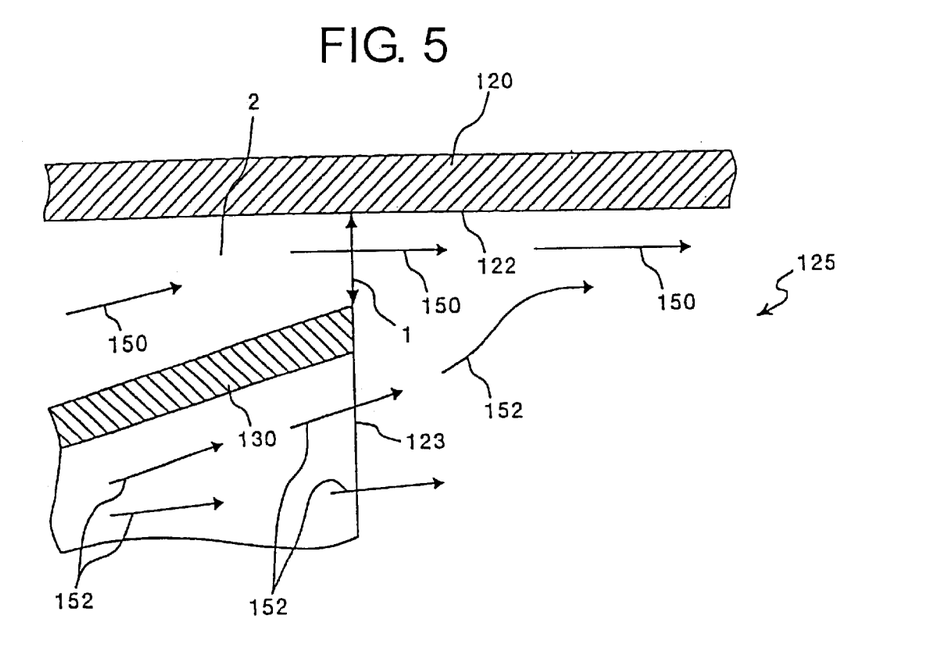
FIG. 5 is an enlarged diagram of sections in the vicinity of an opening of an internal cylinder.

FIG. 5 is an enlarged cross-sectional diagram which shows a flow of the air 150 in the vicinity of the clearance 1. Referring to FIG. 5, the air 150 jetted to the inside of the combustion chamber 125 forms a thin film on the internal wall surface 122 of the tail cylinder 120. This film of the air 150 cools the internal wall surface 122 of the tail cylinder 120, and protects the internal wall surface 122 of the tail cylinder 120 from a high-temperature combustion gas 153 which is jetted from the opening section 131 of the internal cylinder 130. According to this embodiment, the air 150 jetted from the clearance 1 cools the tail cylinder 120 in a state of a film, and prevents the whirling of the combustion gas 153 in the vicinity of the opening section 131 of the internal cylinder 130. Therefore, it is possible to suppress the burning of the tail cylinder 120.

Figure 3:
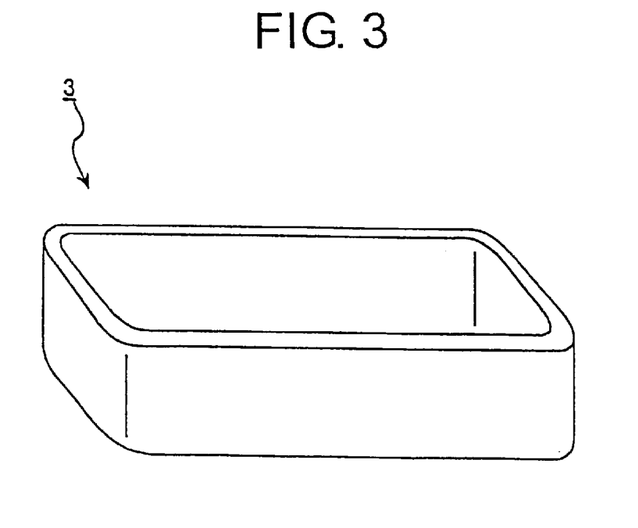
FIG. 3 shows a constituent part of an air path.

In the present embodiment, the air path 3 is formed by welding a box-shaped member having a rectangular cross section onto the internal wall of the internal cylinder 130. However, the shape of the air path 3 is not limited to this, and the air path 3 may have a semi-circular cylindrical shape.

Alternatively, the air path 3 may have a shape corresponding to the space inside the internal cylinder 130. Further, the air path 3 may have a structure having the air inlet 4 and the air supply opening 5 connected together by using a pipe member instead of the box-shaped member. In other words, this air path 3 may play the role of supplying the compressed air 150 at the outside of the internal cylinder 130 to the clearance 1 between the tail cylinder 120 and the internal cylinder 130. As far as the air path 3 plays this role, there is not limit to the shape or the method of installing the air path 3. Further, the air path 3 may not be formed by providing a separate special path like that in the present embodiment. The air path 3 may have a structure of separating the air 150 which has been taken in from the air inlet 4 from the flow of gases 151 and 152 within the internal cylinder 130, with the external peripheral surface of the main nozzle 141 and a substrate 147 or other partition plate.

Figure 6:
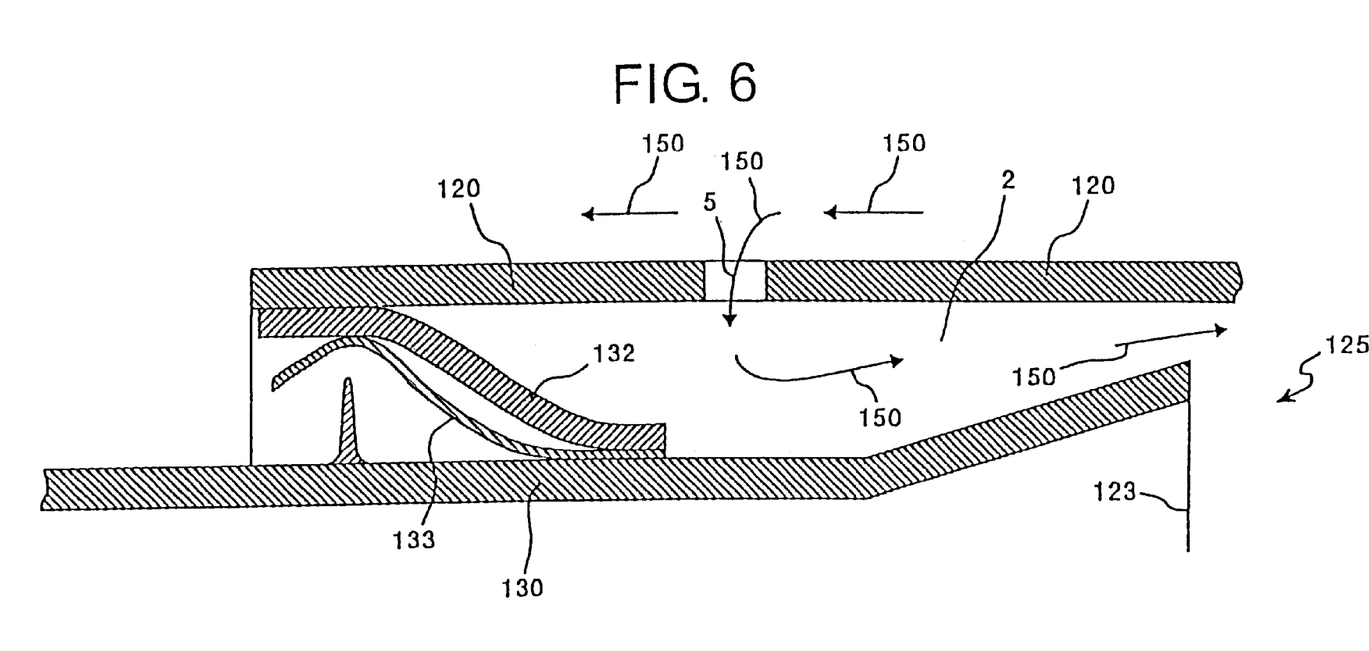
FIG. 6 shows another embodiment of an air-film forming unit.

As a modification of the present embodiment, there may be provided a unit which forms a film of the cooling air 150 based on a separate structure. For example, only the air inlet 4 may be provided at the section of engagement with the internal cylinder 130 on the side surface of the tail cylinder 120, and nothing is provided on the internal cylinder 130 (refer to FIG. 6). According to this structure, the compressed air 150 which flows at the outside of the tail cylinder 120 is taken into the space 2 inside the tail cylinder 120 from the air inlet 4, based on a difference between the pressure inside the tail cylinder 120 and the pressure at the outside. The taken-in air 150 moves inside the space 2, and is jetted along the internal wall surface 122 of the tail cylinder 120 from the clearance 1 between the internal wall surface 122 of the tail cylinder 120 and the opening section 131 of the internal cylinder 130. With this arrangement, a film of the cooling air 150 is formed on the internal wall surface 122 of the tail cylinder 120, and the tail cylinder 120 is cooled in a film state. It is desirable to provide the air inlet 4 on the side surface of the tail cylinder 120, from the viewpoint of simplification of the structure. However, in general, the tail cylinder 120 has low rigidity for light weight. Therefore, it is not possible to maintain the strength of the tail cylinder 120, when eight air inlets 4 are provided like in the present embodiment. Therefore, when it is not possible to sufficiently maintain the strength of the tail cylinder 120, it is preferable that the air path 3 is provided at the internal cylinder 130 side like that in the above embodiment.

The unit which forms a film of the cooling air 150 may have a structure that a slit (not shown) is communicated from the outside to the space 2 at the engagement section, on the sealing plate 133 installed on the internal cylinder 130. In this structure, the external compressed air 150 flows into the space 2 at the engagement section through the slit of the sealing plate 133 based on a difference between the external pressure and the pressure inside the combustion chamber 125. The compressed air 150 is jetted along the internal wall surface 122 of the tail cylinder 120 from the clearance 1 between the tail cylinder 120 and the internal cylinder 130, and a film of the cooling air 150 is formed on this internal wall surface 122. According to this structure, the internal wall surface 122 of the tail cylinder 120 is cooled with the formed film of the cooling air 150, and it becomes possible to suppress the burning of the internal wall surface 122 due to the high-temperature combustion gas 153 which is blown out from the opening section 131 of the internal cylinder 130.

In the present embodiment, it is also possible to provide an air adjusting unit (not shown), which adjusts the taken-in air, on the air inlet 4 of the internal cylinder 130. For this unit, there may be used a flow-rate adjusting valve which is equipped with an adjustment screw and a needle valve, for example.

Figure 7A:
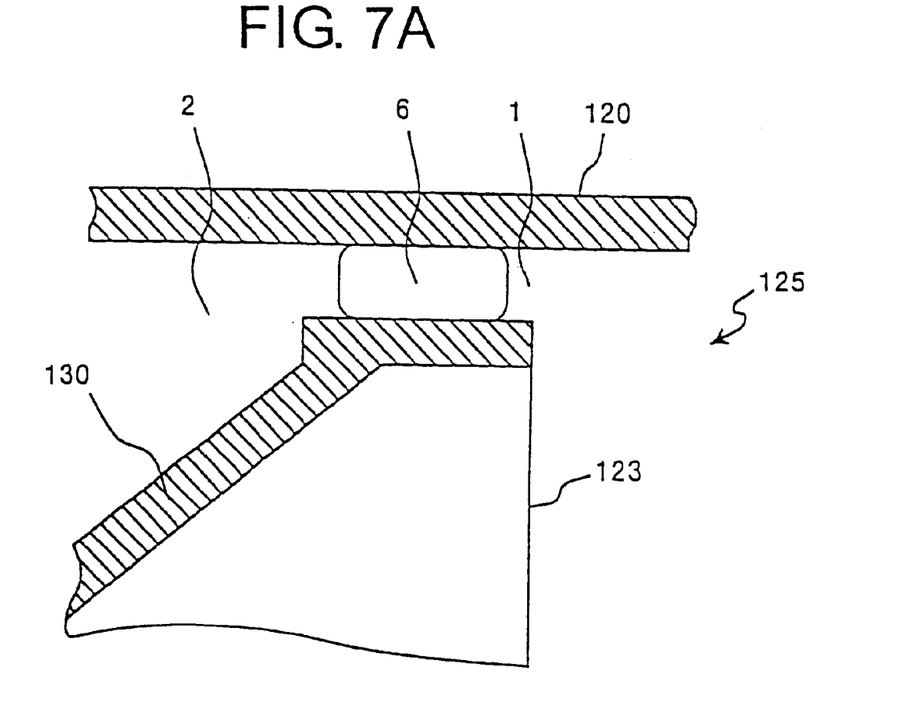
FIG. 7A and FIG. 7B are a side diagram and a front diagram of a clearance maintaining section respectively.
Figure 7B:
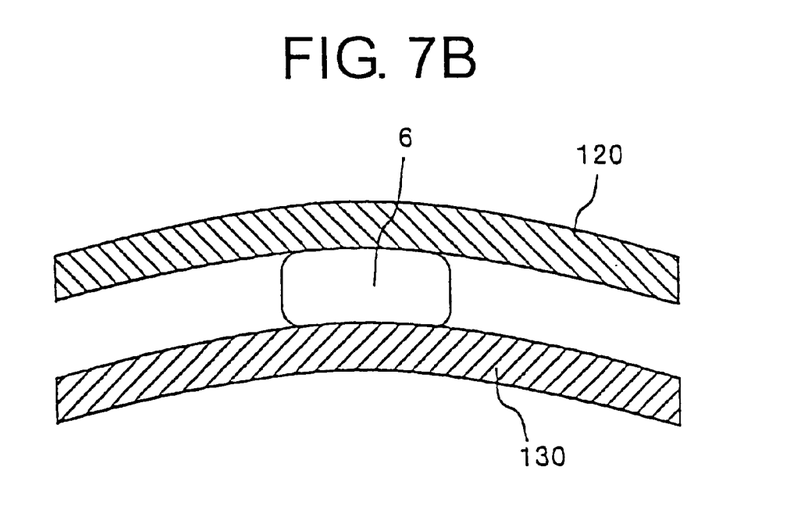

In the present embodiment, it is necessary to provide the clearance 1 which jets the cooling air 150, between the internal wall surface 122 of the tail cylinder 120 and the edge of the opening section 131 of the internal cylinder 130. However, it is generally difficult to secure uniform clearance 1 along the whole external periphery of the opening section 131. In order to secure this clearance 1, a clearance maintaining section 6 may be provided in the clearance 1 between the internal wall surface 122 of the tail cylinder 120 and the edge of the opening section 131 (refer to FIGS. 7A and 7B). In this structure, a plurality of the clearance maintaining section 6 are disposed within the ring-shaped clearance 1, and maintain a height of the clearance 1 to a constant height. With this arrangement, the cooling air 150 within the space 2 is jetted uniformly from the clearance 1 over the whole periphery of the internal wall surface 122 of the tail cylinder 120, thereby to form a uniform film on the internal wall surface 122. According to this structure, as the internal wall surface 122 of the tail cylinder 120 is cooled with the film of the cooling air 150, it becomes possible to suppress the burning of the internal wall surface 122 due to the high-temperature combustion gas 153 which is blown out from the opening section 131 of the internal cylinder 130.

Figure 8:
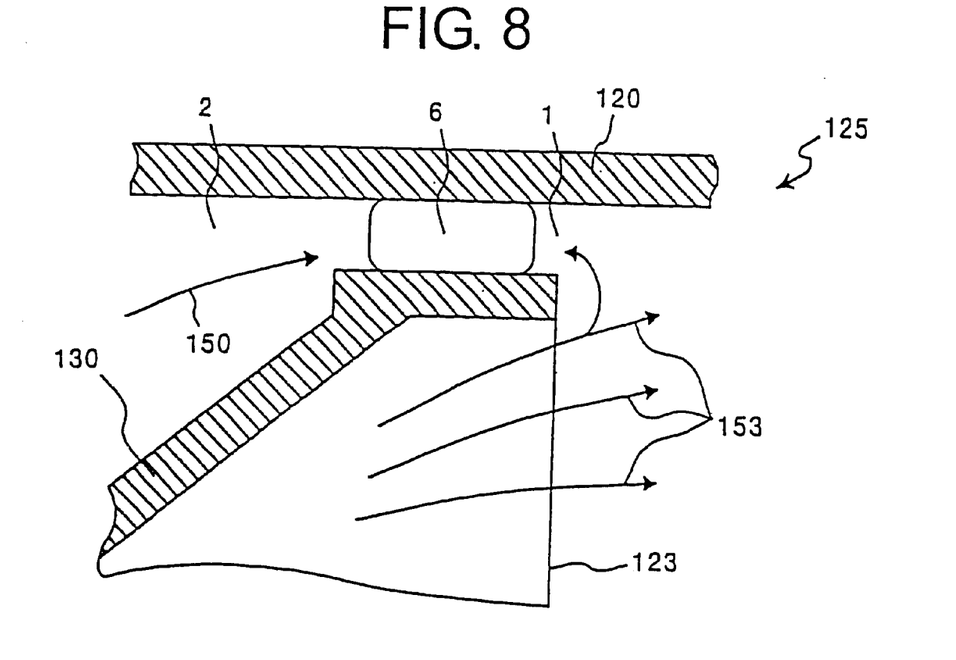
FIG. 8 is a side diagram of a clearance maintaining section.
Figure 9:
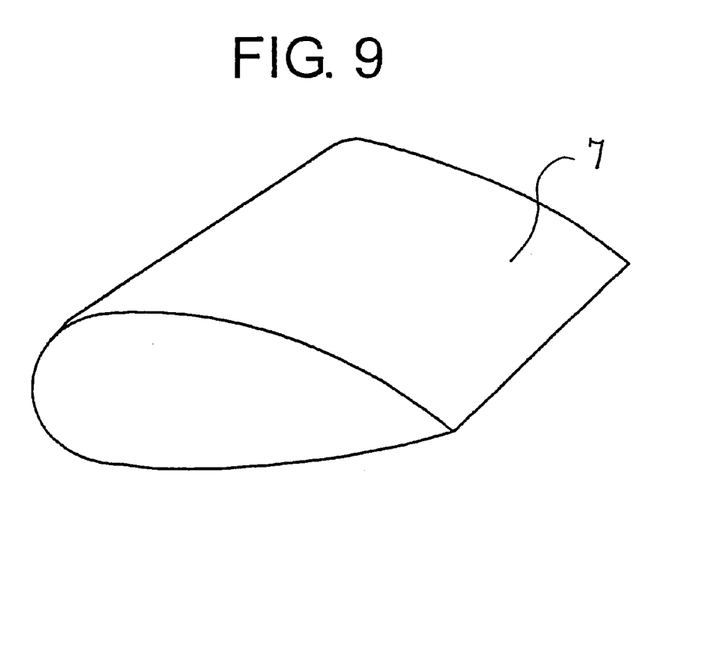
FIG. 9 is a perspective diagram of a clearance maintaining section.

In the mean time, the structure of having the clearance maintaining section 6 installed in the clearance 1 between the internal wall surface 122 of the tail cylinder 120 and the edge of the opening section 131 has a problem. FIG. 8 is an enlarged diagram which shows a flow of the combustion gas 153 in the vicinity of the clearance 1. In FIG. 8, the high-temperature combustion gas 153 blown out from the opening section 131 of the internal cylinder 130 is taken into the whirl which is generated at the back of the clearance maintaining section 6 due to the shape of this clearance maintaining section. Therefore, there has been a problem that the internal wall surface 122 of the tail cylinder 120 is burnt due to the whirled combustion gas 153. In order to solve this problem, the clearance maintaining section 6 may have a wing shape (refer to FIG. 9), and this wing tail 7 may be disposed to face the downstream of the cooling air 150. Based on this structure, the wing-shaped clearance maintaining section 6 reduces the generation of whirl, and it becomes possible to suppress the whirling of the combustion gas 153. Therefore, it is possible to suppress the burning of the tail cylinder 120.

Figure 10:
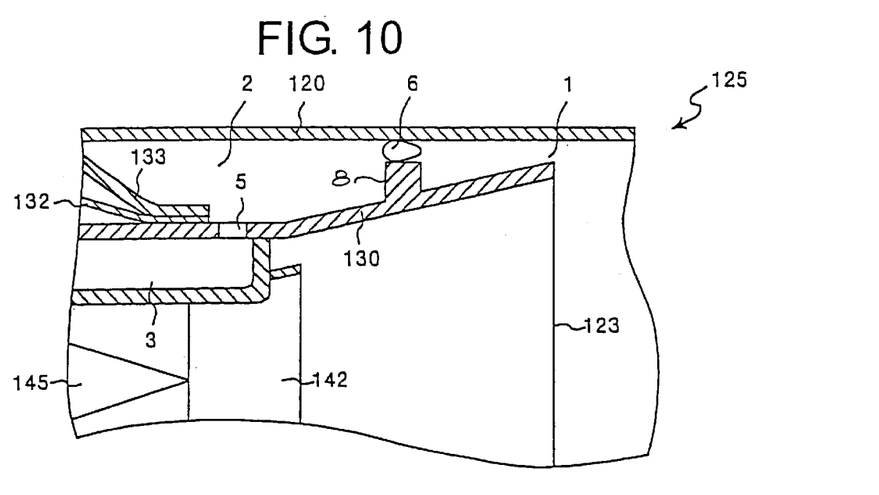
FIG. 10 is a side diagram which shows a structure including a clearance maintaining section.

The clearance maintaining section 6 may be disposed at the upstream of the clearance 1 from which the cooling air 150 is jetted out at the section of engagement between the tail cylinder 120 and the internal cylinder 130 (refer to FIG. 10). In FIG. 10, the clearance maintaining section 6 is fixedly installed by welding on a protrusion 8 formed on the side surface of the opening section 131 of the internal cylinder 130, with a wing tail 7 faced to the downstream. According to this structure, the clearance maintaining section 6 is disposed at the upstream of the clearance 1. Therefore, little influence is applied to the flow of the cooling air 150 in this clearance 1. As a result, it is possible to suppress the whirling of the combustion gas 153, and it is also possible to jet uniformly the cooling air 150 from the clearance 1.

As explained above, according to the gas turbine combustor of the present invention, the air jetted from the clearance between the tail cylinder and the internal cylinder forms a film of the cooling air on the internal wall surface of the tail cylinder. Therefore, the internal wall surface of the tail cylinder is protected from the high-temperature combustion gas which is blown out from the opening section of the internal cylinder. As a result, it is possible to suppress the burning of the internal wall surface.

Moreover, the air-film forming unit supplies air to the clearance between the tail cylinder and the internal cylinder from the outside of the internal cylinder. The air-film forming unit causes this air to be jetted from this clearance, thereby to form a film of the cooling air on the internal wall surface of the internal cylinder. Therefore, the internal wall surface of the tail cylinder is protected from the high-temperature combustion gas which is blown out from the opening section of the internal cylinder. As a result, it is possible to suppress the burning of the internal wall surface.

Furthermore, the air-film forming unit takes air into the clearance between the tail cylinder and the internal cylinder from the outside of the internal cylinder. The air-film forming unit causes this air to be jetted from this clearance, thereby to form a film of the cooling air on the internal wall surface of the internal cylinder. Therefore, the internal wall surface of the tail cylinder is protected from the high-temperature combustion gas which is blown out from the opening section of the internal cylinder. As a result, it is possible to suppress the burning of the internal wall surface.

Moreover, the clearance maintaining section maintains the clearance between the tail cylinder and the internal cylinder. Therefore, it is possible to secure a flow path of cooling air which is jetted from this clearance.

Furthermore, the clearance maintaining section has a wing shape. Therefore, it is possible to suppress the whirling of the combustion gas to the back of the clearance maintaining section.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A gas turbine combustor comprising:

a tail cylinder through which combustion gas flows;

an internal cylinder having an opening section from which combustion gas is blown out, the internal cylinder being inserted and thereby engaged with the tail cylinder such that a clearance is secured between an edge of the opening section and an internal surface of a wall of the tail cylinder; and an air-film forming unit which causes compressed air to be jetted to the internal surface from the clearance thereby to form a film of cooling air on the internal surface, wherein the air-film forming unit includes an air path formed along an internal periphery of the internal cylinder, the air path is disposed between main nozzles which are provided inside the internal cylinder, and the air path is fixedly installed at a position where the tail cylinder and the internal cylinder are engaged.

2. The gas turbine combustor according to claim 1, wherein said air-film forming unit comprises:

an air inlet, formed on a side surface of said internal cylinder, from which the compressed air is taken into said internal cylinder;

an air path, installed inside said internal cylinder, through which the compressed air taken in from said air inlet is guided; and an air supply opening, provided at a section of engagement between said tail cylinder and said internal cylinder, from which the guided compressed air is supplied to the clearance.

3. The gas turbine combustor according to claim 1, wherein said air-film forming unit comprises an air inlet, provided at a section of engagement between said tail cylinder and said internal cylinder on a side surface of said tail cylinder, from which cooling air jetted from the clearance is taken in.

4. The gas turbine combustor according to claim 1, further comprising:

a clearance maintaining section which maintains the clearance, and which is installed between the internal wall surface of said tail cylinder and the external peripheral surface of said internal cylinder.

5. The gas turbine combustor according to claim 4, wherein said clearance maintaining section has a wing shape.

* * * * *